United States Patent [19]
Liu

[11] Patent Number: 5,207,926
[45] Date of Patent: May 4, 1993

[54] INDUSTRIAL WASTE WATER TREATMENT PROCESS

[76] Inventor: Kun-Hei Liu, 2F., No. 32, Lane 200, Tung Hwa Street, Taipei, Taiwan

[21] Appl. No.: 882,862

[22] Filed: May 14, 1992

[51] Int. Cl.$^5$ .................................................. C02F 9/00
[52] U.S. Cl. .................................... 210/749; 210/806; 210/807
[58] Field of Search .............. 210/724, 743, 749, 765, 210/663, 668, 669, 688, 806, 807

[56] References Cited

U.S. PATENT DOCUMENTS 4,163,716 8/1979 Turnbull .............................. 210/28

Primary Examiner—Ivars Cintins
Attorney, Agent, or Firm—Varndell Legal Group

[57] ABSTRACT

An industrial waste water treatment process including a step of guiding a waste water from chemical solution treatment troughs by a gutter into a waste water reservoir through a wire gauge filter; a step of adding a chemical solution, which contains NaOH and $H_2O$ at the ratio of 25:75 by volume, into the waste water reservoir to destroy the acidic substances in the collected waste water; a step of pumping the collected waste water from the waste water reservoir to a water filtration tower for filtration through a series of water filtration tanks, permitting the filtrated water to be guided into a depositing reservoir; and a step of pumping the water from the depositing reservoir to a water tower for re-use.

3 Claims, 1 Drawing Sheet

INDUSTRIAL WASTE WATER TREATMENT PROCESS

BACKGROUND AND SUMMARY OF THE INVENTION

The present invention relates to a waste water treatment process, and more particularly, the present invention relates to an industrial waste water treatment process which turns an industrial waste water into clean water for repeated use.

The waste water of a factory shall be properly treated before discharging into a drainage system, so that water pollution problem can be eliminated or minimized. However, it is a pity that the treated water can not be collected for repeated use.

The present invention has been accomplished under the aforesaid circumstances. It is therefore an object of the present invention to provide an industrial waste water treatment process which eliminates the industrial waste water from causing an environmental pollution problem. It is another object of the present invention to provide an industrial waste water treatment process which makes the industrial waste water practical for repeated use. It is still another object of the present invention to provide an industrial waste water treatment process which requires less installation space. It is still another object of the present invention to provide an industrial waste water treatment process which is easy to maintain.

DETAILED DESCRIPTION OF THE PREFERRED EMBODIMENT

Figure 1:
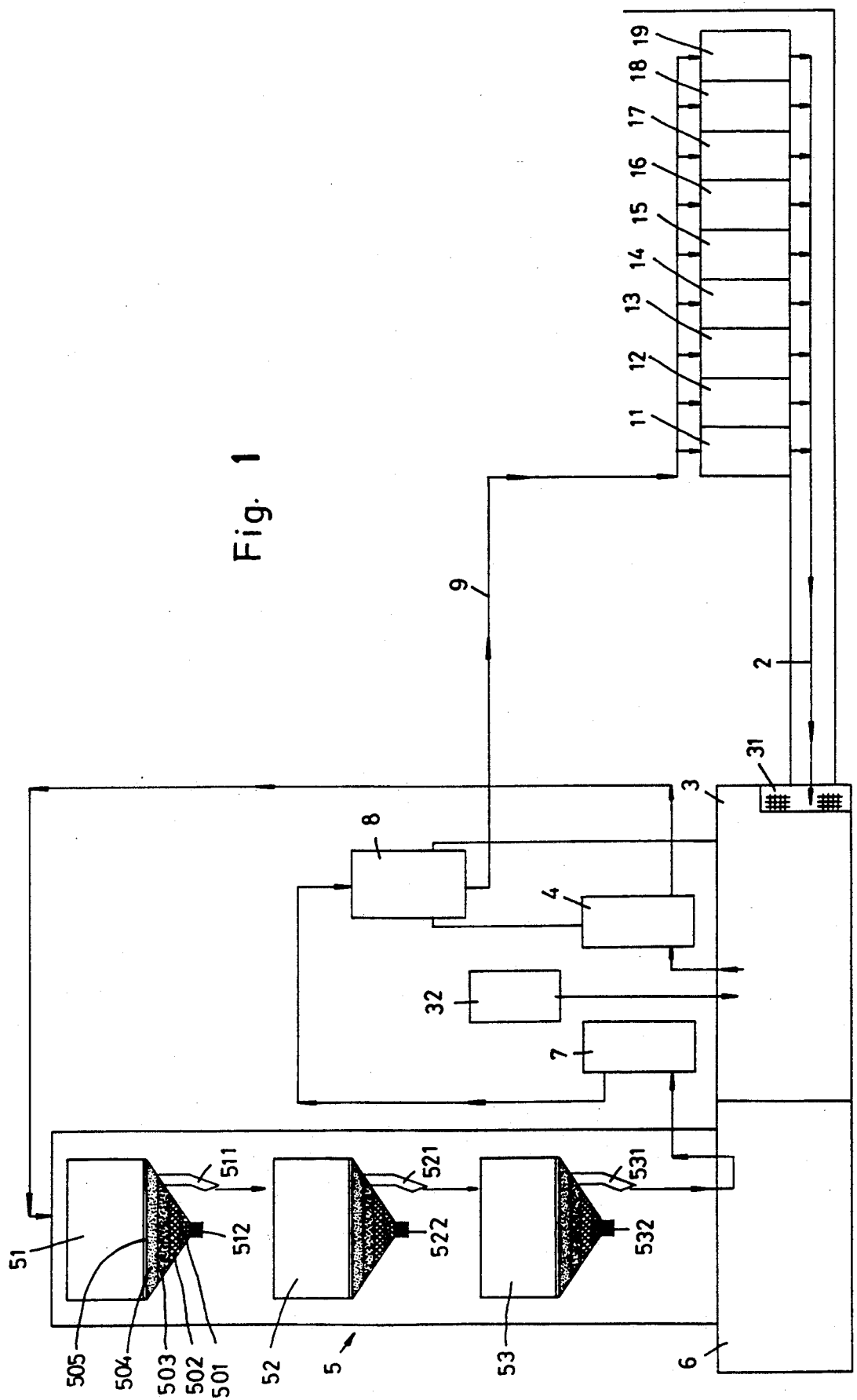
FIG. 1 is a flow chart showing the processing procedure of the industrial waste water treatment process according to the present invention.

In processing iron pipes, the iron rust must be removed before the process of spray painting. Removing the iron rust from the surface of iron pipes is generally made by dipping iron pipes into different troughs which contain water or different chemical solutions. As illustrated in FIG. 1, iron pipes are dipped in degreasing trough 11, water trough 12, sulfate trough 13, sulfate trough 14, water trough 15, oxalate trough 16, phosphate trough 17, phosphate trough 18, and water trough 19. Dipping iron pipes in the troughs or removing them from the troughs may cause the water or chemical solutions to overflow. The waste water from the troughs is guided by a gutter 2 into a waste water reservoir 3 through a wire gauze filter 31. A chemical solution 32 which contains NaOH (caustic soda) and $H_2O$ at the ratio of 25:75 by volume is filled into the waste water reservoir 3 to destroy the acidic substances in the waste water contained therein. The waste water is then pumped to a water filtration tower 5 by a water pump 4. The water filtration tower 5 is comprised of a plurality of filtration tanks 51, 52, 53 with one above another. The top filtration tank 51 has an outlet pipe 511 connected to the intermediate filtration tank 52; the intermediate filtration tank 52 has an outlet pipe 521 connected to the bottom filtration tank 53; the bottom filtration tank 53 has an outlet pipe 531 connected to a depositing reservoir 6. The filtration tanks 51, 52, 53 have drain valves 512, 522, 532 which can be conveniently opened when the filtration tanks have to be cleaned. The filtration tanks 51, 52, 53 are similar in structure, each comprised of a layer of pebbles 501, a layer of wire gauze filter 502, a layer of active carbons 503, a layer of sands 504, and a layer of limes 505 respectively properly arranged with one above another. After the filtration process, the filtrated water is then pumped from the depositing reservoir 6 to a water tower 8 by another water pump 7, and then guided by a water pipe 9 to the troughs 11, 12, 13, 14, 15, 16, 17, 18, 19 for repeated use.

I claim:

1. A method of treating waste water resulting from a process for removing iron rust from iron pipes before spray painting, which consists essentially of the steps of:
   (a) collecting waste water containing iron rust from a plurality of troughs used to remove said iron rust from said iron pipes into a gutter,
   (b) feeding said waste water through a wire gauge screen into a waste water reservoir,
   (c) adding a chemical solution containing NaOH and $H_2O$ in a volume ratio of NaOH to $H_2O$ of 25:75 to said waste water in said waste water reservoir,
   (d) feeding treated water from said waste water reservoir to a water filtration tower and passing said treated waste water through a plurality of water filtration tanks arranged in series, and then collecting filtered waste water into a depositing reservoir, and
   (e) pumping said collected filter waste water from said depositing reservoir to a water tower for reuse.

2. The method of treating waste water resulting from a process for removing iron rust from iron pipes before spray painting according to claim 1, wherein said water filtration tanks respectively include a layer of pebbles, a layer of wire gauze filter, a layer of active carbons, a layer of sands, and a layer of limes.

3. The method of treating waste water resulting from a process for removing iron rust from iron pipes before spray painting according to claim 2, wherein said plurality of troughs include a degreasing trough, a first water trough, a first sulfate trough, a second sulfate trough, a second water trough, an oxalate trough, a first phosphate trough, a second phosphate trough, and a third water trough.

* * * * *